(12) United States Patent
Zalokar et al.

(10) Patent No.: US 10,279,435 B2
(45) Date of Patent: May 7, 2019

(54) STICK ELECTRODE

(71) Applicant: Lincoln Global, Inc., City of Industry, CA (US)

(72) Inventors: Joseph Kenneth Zalokar, Willoughby, OH (US); Matthew Jay James, Brunswick, OH (US); David Christopher Fedor, North Royalton, OH (US); Janet Michelle Morse, Painesville, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 37 days.

(21) Appl. No.: 14/714,984

(22) Filed: May 18, 2015

(65) Prior Publication Data

US 2015/0360325 A1 Dec. 17, 2015

Related U.S. Application Data

(60) Provisional application No. 62/010,850, filed on Jun. 11, 2014.

(51) Int. Cl.
| | |
|---|---|
| *B23K 9/00* | (2006.01) |
| *B23K 35/30* | (2006.01) |
| *B23K 35/02* | (2006.01) |
| *B23K 35/36* | (2006.01) |
| *B23K 35/365* | (2006.01) |

(Continued)

(52) U.S. Cl.
CPC ............ *B23K 35/0266* (2013.01); *B23K 9/00* (2013.01); *B23K 9/0008* (2013.01); *B23K 9/282* (2013.01);

(Continued)

(58) Field of Classification Search
CPC ............ B23K 35/0261; B23K 35/0266; B23K 35/262; B23K 35/264; B23K 35/268;
(Continued)

(56) References Cited

U.S. PATENT DOCUMENTS

| 3,084,074 A * | 4/1963 | Wasserman | ........ B23K 35/0272 |
| | | | 428/381 |
| 3,423,565 A * | 1/1969 | Malchaire | .......... B23K 35/0261 |
| | | | 219/146.3 |

(Continued)

FOREIGN PATENT DOCUMENTS

| CN | 1880005 A | 12/2006 |
| CN | 102123814 A | 7/2011 |

(Continued)

OTHER PUBLICATIONS

Search Report and Written Opinion from International Application No. PCT/IB2015/000910 dated Oct. 15, 2015.

(Continued)

*Primary Examiner* — Dana Ross
*Assistant Examiner* — Joe E Mills, Jr.

(57) ABSTRACT

The exposed metal tip of the strike end of an SMAW welding electrode is covered with a protective coating formed from a binder and metal particles. Because metal particles rather than graphite particles are used to provide electrical conductivity to this protective coating, flare-up of the arc when initially struck is eliminated substantially completely. In addition, the potential for weld porosity problems is also eliminated, because the metal particles of the inventive electrode do not produce $CO_2$ as a reaction by-product which can ultimately lead to improper welding technique.

18 Claims, 1 Drawing Sheet

(51) Int. Cl.
*B23K 35/40* (2006.01)
*B23K 35/26* (2006.01)
*B23K 35/28* (2006.01)
*B23K 35/32* (2006.01)
*B23K 9/28* (2006.01)

(52) U.S. Cl.
CPC ........ *B23K 35/0261* (2013.01); *B23K 35/262* (2013.01); *B23K 35/264* (2013.01); *B23K 35/268* (2013.01); *B23K 35/28* (2013.01); *B23K 35/284* (2013.01); *B23K 35/286* (2013.01); *B23K 35/30* (2013.01); *B23K 35/302* (2013.01); *B23K 35/3026* (2013.01); *B23K 35/3033* (2013.01); *B23K 35/3053* (2013.01); *B23K 35/327* (2013.01); *B23K 35/365* (2013.01); *B23K 35/3607* (2013.01); *B23K 35/406* (2013.01)

(58) Field of Classification Search
CPC .... B23K 35/28; B23K 35/284; B23K 35/286; B23K 35/30; B23K 35/302; B23K 35/3026; B23K 35/3033; B23K 35/3053; B23K 35/327; B23K 35/3607; B23K 35/365; B23K 35/406; B23K 9/00; B23K 9/0008; B23K 9/282
USPC ............................. 219/137 R, 145.22, 145.1
See application file for complete search history.

(56) References Cited

U.S. PATENT DOCUMENTS

| | | | | |
|---|---|---|---|---|
| 3,511,960 | A * | 5/1970 | De Haeck | B23K 9/035 219/137 R |
| 8,901,455 | B2 * | 12/2014 | Schaeffer | B23K 9/186 219/145.22 |
| 2006/0081579 | A1 * | 4/2006 | Kotecki | B23K 35/0266 219/145.22 |
| 2006/0219684 | A1 * | 10/2006 | Katiyar | B23K 35/3607 219/145.22 |
| 2006/0261054 | A1 * | 11/2006 | Katiyar | B23K 35/40 219/145.22 |
| 2006/0278627 | A1 * | 12/2006 | Burt | C21D 9/0068 219/145.23 |
| 2009/0314759 | A1 * | 12/2009 | Schaeffer | B23K 35/00 219/145.22 |
| 2012/0241432 | A1 * | 9/2012 | Lin | B23K 35/3602 219/145.22 |
| 2014/0248509 | A1 * | 9/2014 | Cheney | B22F 3/115 428/641 |
| 2014/0263259 | A1 * | 9/2014 | Narayanan | B23K 35/3053 219/145.22 |

FOREIGN PATENT DOCUMENTS

| | | |
|---|---|---|
| EP | 1733838 A2 | 12/2006 |
| JP | S58107296 A | 6/1983 |
| JP | S59156600 A | 9/1984 |
| JP | H07155981 A | 6/1995 |
| KR | 20010057542 A | 7/2001 |
| SU | 496142 A1 | 12/1975 |

OTHER PUBLICATIONS

International Preliminary Report on Patentability from PCT Application No. PCT/IB2015/000910 dated Dec. 22, 2016.
Chinese Office Action for Chinese Patent Application No. 201580028776.7 dated Jun. 29, 2018 in 9 pages.

* cited by examiner

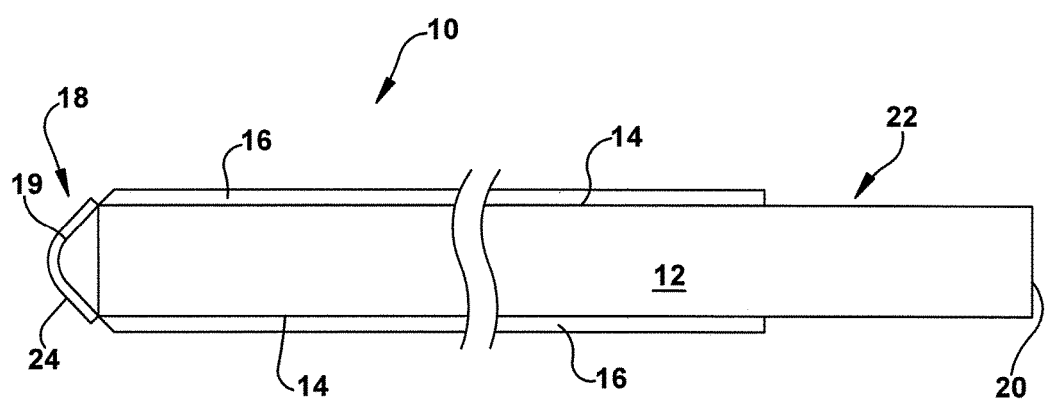

STICK ELECTRODE

RELATED APPLICATION

The present application is being filed as a non-provisional patent application claiming priority/benefit under 35 U.S.C. § 119(e) from U.S. Provisional Patent Application No. 62/010,850 filed on Jun. 11, 2014, the entire disclosure of which is incorporated herein by reference.

BACKGROUND

A "stick" electrode is the common vernacular used to describe the type of welding electrode which is used in the SMAW Welding process (shielded metal arc welding).

FIG. 1 illustrates the structure of a conventional stick electrode used in SMAW. As shown there, stick electrode 10 takes the form of a solid, essentially straight, essentially rigid elongated core rod or stick 12 made from a weld filler metal such as mild steel, nickel/steel alloy, chromium/nickel alloy and the like. Core rod 12, which is typically 9 to 18 inches long and 1/16 to 1/4 inch in diameter, defines longitudinal surfaces 14, i.e., surfaces running along the length of the rod, which are covered with a coating 16 of weld flux ingredients. Alloying elements for inclusion in the weld metal to be made from stick electrode 10 may also be included in coating 16.

As further shown in FIG. 1, stick electrode 10 defines a distal or "strike" end 18, which is intended to engage the workpiece to be welded and an opposite "holder" end 20, which is intended to be mounted in the holder assembly (not shown) connected to the SMAW welding machine with which stick electrode 10 will be used. For this purpose, a portion of coating 16 is removed from longitudinal surfaces 14 in holder end 20 as shown at 22 in FIG. 1.

After stick electrode 10 has been mounted in place in the holder assembly connected to its welding machine, welding of the workpiece begins by striking an arc (i.e., generating an electrical arc) between the exposed metal tip 19 of strike end 18 of stick electrode 10 and the surface of the workpiece to be welded. In SMAW, this is done by sliding the exposed metal tip 19 strike end 18 along the surface of the workpiece to initiate current flow and then quickly breaking contact between strike end 18 and the workpiece by drawing the two apart slightly. If done properly, electrical current continues to flow between strike end 18 and the workpiece through the small space that separates the two. The intense heat created by this current flow ionizes the surrounding atmospheric gases, thereby generating extremely bright light, i.e., the arc. If strike end 18 is withdrawn from the workpiece too quickly, the arc either will not be generated at all or if generated will extinguish almost immediately. If strike end 18 is withdrawn from the workpiece too slowly, it will melt and thereby bond (i.e., weld) the electrode to the workpiece, referred to as "stubbing out" in the welding industry.

A common problem associated with SMAW welding electrodes of this type is that the exposed metal tip 19 of strike end 18 can carry a significant layer of rust. In manufacture, coating 16 is normally applied to rod 12 in the form of an aqueous flux dispersion, after which the coated rod so formed is heated to evaporate the water of the dispersion and set any binder that may be present. Temperatures as high as 1,000° F. are normally encountered. At these elevated temperatures, and in the presence of the steam generated as a result of evaporating the water of the flux dispersion, exposed metal tip 19 of metal rod 12 readily oxidizes since it is not covered with any type of protective layer. As a result, a layer of rust normally forms on this tip. Unfortunately, this layer of rust can prevent stick electrode 10 from operating properly, since it not only prevents intimate physical contact between the workpiece being welded and exposed metal tip 19 of strike end 18 of electrode 10 but also because of its poor electrical conductivity.

To deal with this problem, it has already been proposed to apply electrically conductive protective coating 24 to exposed metal tip 19 of strike end 18 of electrode 10 during its manufacture. For this purpose, an aqueous dispersion of particulate graphite and an inorganic binder is normally applied to this exposed metal tip after the aqueous flux dispersion forming coating 16 is applied but before the coated rod so formed is fired. When the modified rod so formed is then fired, the water in this graphite dispersion evaporates and the inorganic binder in the dispersion fuses to form a coherent binder holding the individual graphite particles in place on exposed metal tip 19 of strike end 18. Waterglass (sodium silicate) is normally used as the inorganic binder, not only because it can withstand the high temperatures involved during firing but also because it can prevent oxidation of exposed metal tip 19 of strike end 18 during the firing process. Meanwhile, graphite particles are used to provide electrical conductivity to protective coating 22, not only because of their high electrical conductivity but also because they readily decompose to form a benign by-product, $CO_2$, as soon as welding begins.

SUMMARY

In accordance with this invention, a modified stick electrode of the above type is made by forming protective coating 24 metal particles, preferably particulate aluminum and/or magnesium, instead of the graphite particles used in earlier technology. As a result, it has been found that certain problems associated with the use of conventional tip-protected stick electrodes as described above, such as excessive flare-up during weld initiation, can be avoided substantially completely.

Thus, this invention provides a modified tip-protected stick electrode comprising an essentially rigid elongated metal rod or wire made from a weld filler metal, the metal rod or wire defining a strike end having an exposed metal tip, a proximal end opposite the strike end and lateral surfaces extending between the strike end and the proximal end, the stick electrode further comprising a protective coating covering the exposed metal tip of the strike end, wherein the protective coating comprises a binder and metal particles.

DETAILED DESCRIPTION

Stick Electrode

There are two basic types of consumable welding electrodes used in the arc welding industry, continuous electrodes and stick electrodes.

A continuous welding electrode normally takes the form of a long metal wire or rod of indeterminate length, e.g., 500 feet (~152 meters), which is flexible enough so that it can be wound around a supply spool for continuous or semi-continuous feeding in the direction of its length.

In contrast, a stick electrode normally takes the form of a relatively short rod or wire of a convenient, predetermined length such as 9 to 18 inches (~23 to 46 cm). Stick electrodes are used serially, i.e., a first stick electrode is used until it becomes too short, at which time it is discarded and a new stick electrode is selected for further use.

Stick electrodes can be used by hand, in which case the stick electrode is clamped into a holder attached to a welding power supply which is held in the hand of the welder. Stick electrodes can also be used with welding machines that are equipped with holder assemblies in which the stick electrode is removably mounted.

Stick electrodes are normally essentially rigid. In other words, they are normally too rigid to be wound around a supply spool as in the manner of continuous electrodes.

A stick electrode can be composed of a simple, solid metal rod or wire with no external coating. Or it can be provided with a suitable coating on its outside lateral surfaces such as the flux coatings found on the SMAW welding electrode described above and cellulosic materials also found in certain types of SMAW welding electrodes.

Stick electrodes can also be composed of a metal rod or wire having a hollow core, which can be filled with a suitable welding flux, different metal particles for alloying with the weld metal to be formed or both.

This invention is applicable to any type of stick electrode, whether coated or uncoated and whether having a solid or hollow core.

For convenience, the following disclosure describes this invention in connection with a stick electrode having a flux coating on its external lateral surfaces. However, it will be understood this invention is applicable to any type of stick electrode including, but not limited to, those used for SMAW.

Rod Substrate

The foundation or core of the inventive stick electrode is a metal rod or wire. When the inventive stick electrode takes the form of SMAW electrode of the type illustrated in FIG. 1, this foundation can also comprise a solid, essentially straight, essentially rigid elongated rod or stick 12 made from a suitable weld filler metal. In other embodiments, this foundation can comprise a metal rod or wire having a hollow core including a suitable filler material such as a welding flux, powder metal alloying elements, ceramic materials, etc.

Any type of metal can be used for making this metal rod or wire foundation. Examples include mild steel, various iron/chrome alloys such Type 304, Type 309, various iron/nickel alloys such as SAE 2xxx, various nickel/chromium alloys such as UNS N06600, N06601, N06603, various nickel alloys such as UNS N10276, UNS N06600 and UNS 07718, various aluminum alloys such as 4043, various titanium alloys such as ASTM B348 Grade 1, ASTM B265 Grade 2 and ASTM B265 Grade 12 and the like. As well understood in the welding arts, the particular type and composition of weld filler metals to use in the non-autogenous welding of different workpieces depends primarily on the identity of the particular metal from which the workpiece to be welded is made. This technology is well known in the welding arts and can readily be determined by skilled welding professionals on a case by case basis.

The shape and size of the metal rod or wire forming the foundation of the inventive stick electrode is not critical and any shape or size can be used which is effective in making stick electrodes for arc welding. Normally, however, this metal rod or wire will have the same shape and size as the core rod of conventional tip-protected stick electrodes such as those described above. Thus, this metal rod or wire foundation will typically have a length of about 9 to 18 inches (~23 to 46 cm) and a diameter of about 3/32 to 1/4 inch (~2.4 to 6.4 mm). Longer and shorter lengths, as well as larger and smaller diameters, can be used, if desired. For example, the diameter of this metal rod or wire foundation can be a small as 1/16 inch (~1.6 mm) or less and as large as 3/8 inch (~9.5 mm) or more.

Also, as in the case of the metal rod or wire foundation of the conventional tip-protected stick electrode described above, the metal rod or wire foundation of the inventive stick electrode defines a strike end 18 having an exposed metal tip 19 as well as an opposite proximal end 20 for mounting in a welding machine or holding in the hand.

Flux Coating

In those embodiments in which the inventive stick electrode takes the form of an SMAW welding electrode, this electrode also includes a flux coating 16 on its outside longitudinal surfaces in the same manner as the conventional tip-protected SMAW welding electrode described above, Any type of flux ingredients that are used in the manufacture of a conventional tip-protected SMAW welding electrode can be used to make flux coating 16 of the inventive SMAW welding electrode. Examples include various fluorides such as $CaF_2$, $Na_3AlF_6$, NaF, $K_3AlF_6$, various oxides such as $SiO_2$, $TiO_2$, $ZrO_2$, $Mn_2O_3$, $Al_2O_3$, $Cr_2O_3$, $Fe_2O_3$, $CaCO3$, $Na2CO3$, $K2CO3$ and various metallic ingredients such as Fe, Al, Ti, Si, Mn, Mo, Ni, Cr, and Mg. In addition, flux coating 16 optionally can also include metal alloy powders and compounds which contribute to the chemical composition of the weld being formed.

Selecting the particular types and amounts of flux and other ingredients to use in forming flux coating 16 of the inventive SMAW welding electrode of this embodiment depends on the particular metal from which the workpiece to be welded is made, as well as the composition of the weld filler material forming metal rod or wire foundation of this SMAW welding electrode and the target chemical composition of the weld that is to be made. As in the case of selecting the particular weld filler metal to use in specific applications of this invention, selecting the particular types and amounts of flux and other ingredients to use in forming flux coating 16 of the inventive SMAW welding electrode of this embodiment is based on technology which is well known in the welding arts and therefore can readily be determined by skilled welding professionals on a case by case basis.

Tip Protective Coating

In accordance with this invention, the tip of the strike end 18 of the inventive stick electrode 10 is provided with a protective coating 24 which is composed of a binder and metallic particles.

Particles made from essentially any metal or metal alloy which has a melting temperature of at least 1,000° F. (538° C.) and which readily oxidizes in air at the temperatures normally encountered in arc welding (e.g., 6,500° F., 3,600° C.) can be used for this purpose. So, for example, these particles can be made from metals, as well as alloys of metals, selected from alkaline earth meals such as Mg, Ca, Sr and Ba, transition metals such as Ti, V, Cr, Mn, Fe, Cr, Ni, Cu, Y, Zr, Nb, Mo and Ag, "other metals" such as Al, Sn, Pb and Bi and metalloids such as Sb and Te. In this context, an alloy of a particular metal will be understood to mean an alloy containing at least 50 wt. % of that metal. Mixtures of these metal particles can also be used.

More commonly, these metal particles will be made from metals, as well as alloys of metals, selected from alkaline earth meals such as Mg and Ca, Sr, transition metals such as, Va, Cr, Mn, Fe, Cr, Ni, Cu, Zr and Mo, and "other metals" such as Al, Sn, Pb and Bi. Mixtures of these metal particles can also be used. Even more commonly, these metal particles will be made from metals, as well as alloys of metals, selected from Mg, Ca, Fe, Cr, Ni, Cu, Mo, Al, Sn, Pb and Bi. Likewise, mixtures of these metal particles can also be used.

Metal particles made from metals and alloys formed from Mg, metal particles made from metals and alloys formed from Al, and mixtures of such metal particles are especially preferred.

More interesting are metal particles made from Al and Al alloys containing at least 80 wt % Al, more typically at least 90 wt. % Al. Also more interesting are metal particles made from Mg and Mg alloys containing at least 80 wt % Mg, more typically at least 90 wt. % Mg. Even more interesting are batches of metal particles which are formed from mixtures of the Al and Mg based metal particles, especially those in which the weight ratio of Al-based particles to Mg-based particles is about 0.2-7, more typically 0.4-3.6, 0.6-2.5, or even 1.0-1.5.

The average particle size of these metal particles will typically range between about 10 to 600 microns (0.001 to 0.060 millimeters), more typically about 40 to 400 microns (0.040 to 0.400 millimeters), or even about 100 to 325 microns (0.100 to 0.325 millimeters). Regarding maximum average particle size, if the average particle size is too large, the stick electrode will either not strike at all or will strike only with difficulty. Regarding minimum average particle size, there is no technical constraint on minimum average particle size. On the other hand, there is practical constraint on this minimum in that such metal particles become increasingly cost prohibitive as their average particle sizes become smaller and smaller.

In addition to metal particles, protective coating 24 of the inventive stick electrode 10 also includes a binder. As in the case of the conventional tip-protected stick electrode discussed above, the binder of the inventive stick electrode is also desirably made from waterglass (sodium silicate), because it can withstand the high temperatures involved during firing and, in addition, prevent oxidation of the tip of strike end 18 during the firing process. In addition, waterglass is essentially benign in the sense that its decomposition products formed when welding is initiated do not contaminate the weld metal that is formed. Although waterglass is the preferred inorganic binder for these reasons, any other inorganic which will bind the metallic particles of protective coating 24 to the tip of strike end 18 of rod or wire 12, which will withstand the temperatures encountered in the firing process and which will not contaminate the weld that is formed can also be used. Examples include calcium silicate, potassium silicate, lithium silicate and colloidal silica.

Organic binders can also be used. Examples include molasses, honey, petroleum based binders, animal and vegetable based glues.

The relative amounts of metal particles and binder that are used to form protective coating 24 can vary widely, and essentially any relative amount can be used which will accomplish the purposes of this invention. Thus, the amount of metal particles in protective coating 24 will normally be about 5-50 wt. %, more typically about 10-30 wt. %, 15-25 wt. % or even 18-20 wt. %, of the entire protective coating on a dry weight basis, i.e., disregarding any water that might be present. Conversely, the amount binder in protective coating 24 will normally be about 50-95 wt. %, more typically about 70-90 wt. %, 75-85 wt. % or even 80-82 wt. %, of the entire protective coating on a dry weight basis.

The inventive stick electrode can be made in essentially the same way as the conventional tip-protected stick electrode discussed above. For example, in those embodiments in which the inventive stick electrode takes the form of an SMAW welding electrode, the inventive stick electrode can be made by (1) applying an aqueous flux dispersion to the longitudinal surfaces 14 of rod or wire 12, (2) mechanically working the coated rod so formed to remove this coating in holder area 22 and, if desired, to bevel the tip of strike end 18, (3) applying the aqueous dispersion forming protective coating 24 to the tip of strike end 18, and then (4) firing the product so formed to evaporate the water from both dispersions and bind the respective flux and protective coatings in place.

In this regard, the aqueous dispersion forming protective coating 24 can be applied to the tip of strike end 18 of wire or rod 12 by any conventional technique including dipping, brush coating, roller coating, curtain coating and the like. Most commonly, however, it will be applied by the same technique used in making the conventional tip-protected SMAW welding electrode in which a roller coating device is used to continuously and automatically transfer an appropriate quantity of this dispersion from a suitable supply source to the tips of successive rods or wires 12 moving passed the roller coating device in an automatic manufacturing machine. For this purpose, it is desirable that the aqueous dispersion used for forming protective coating 24 have a density of 10 to 5000 cps, more commonly 25 to 2000 cps, or even 50 to 400 cps.

From the above, it can be seen that a primary difference between the inventive stick electrode and the conventional tip-protected stick electrode discussed above is that metal particles rather than graphite particles are used to provide electrical conductivity to protective coating 24.

Because of this difference, a much smaller amount of metal particles is normally used to form protective coating 24 of the inventive stick electrode than the amount of graphite particles used to form protective coating 24 of the conventional tip protected stick electrode. So, for example, most typically the amount of metal particles that will used to form protective coating 24 of the inventive stick electrode will be about 18 to 20 wt. % of protective coating 24 on a dry weight basis, and almost always 35 wt. % or less, more commonly 30 wt. % or less or even 25 wt. % or less of protective coating 24 on a dry weight basis. In contrast, the amount of graphite particles used to form protective coating 24 of the conventional tip protected stick electrode is usually about 40 wt. % of the protective coating on a dry weight basis. This means that the amount of metal particles used to make the inventive stick electrode is most commonly about half of the amount of graphite particles used to make the conventional SMAW.

As a consequence of this difference, and further because of the fundamental differences between metal particles and graphite particles in terms of their chemistries and associated reactions, a number of significant advantages are realized by the inventive stick electrode relative to its conventional counterpart.

In this regard, a significant problem that may be encountered during use of the conventional tip-protected stick electrode, especially SMAW electrodes, is excessive flare-up. When an arc is first struck with a conventional electrode, all of the graphite particles in protective coating 22 react with the oxygen in the air causing $CO_2$ to be generated. During this reaction, a very large volume increase occurs due to the transition from solid graphite to gaseous $CO_2$. Because particulate graphite oxidizes so rapidly, and because of this very rapid volume increase, and because of the relatively larger amount of graphite particles used, a much larger arc is created than normal. This phenomenon, which is known as "flare-up," can interfere with proper welding technique, which can ultimately lead to defects in the weld that is formed.

This problem is avoided essentially completely by the inventive stick electrode, because a much smaller amount of metal particles is used for providing electrical conductivity. In addition, metal particles are believed to oxidize more slowly than graphite particles, and moreover the decomposition products formed by the oxidation of metal particles, metal oxides, are solids not gases. Because of these effects, and further because a substantially smaller amount of metal particles is used, flare-up is eliminated essentially completely.

A further advantage of the inventive stick electrode is that the potential for deleterious weld porosity is also eliminated substantially completely. Although there is some disagreement among welding experts on this issue, some believe that the welds produced when a conventional tip-protected welding electrode is first used exhibit increased weld porosity, which is deleterious. Since a conventional stick electrode is totally consumed in about 1 minute of normal welding operation, this can represent a serious problem, because welds with poor porosity will be produced each time a new electrode is used.

In accordance with this invention, this weld porosity problem is also avoided, because the underlying cause of this problem, improper welding technique caused by graphite reacting to form $CO_2$, is not encountered when the inventive stick electrode is used. Rather, as indicated above, the metal particles which are used in the inventive stick electrode oxidize to form metal oxides, which are solids not gases. Because these metal oxides are similar, if not identical, chemically to the metal oxides that form welding fluxes, these oxides simply join and become a part of the molten flux that will normally be present during the welding operation such as the welding flux created by flux coating 16 in the case of an SMAW welding electrode. In any event, because excessive amounts of by product gases are not generated when an arc is struck with the inventive stick electrode, the weld porosity problem associated with the conventional electrode is not encountered.

Although only a few embodiments of this invention are described above, it should be appreciated that many modifications can be made without departing from the spirit and scope of the invention. All such modifications are intended to be included within the scope of this invention, which is to be limited only by the following claims.

The invention claimed is:

1. A modified tip-protected stick electrode comprising an essentially rigid elongated metal rod or wire made from a weld filler metal, the metal rod or wire defining a strike end having an exposed metal tip, a proximal end opposite the strike end and lateral surfaces extending between the strike end and the proximal end, the stick electrode further comprising a protective coating covering the exposed metal tip of the strike end, wherein the protective coating comprises a binder and metal particles, wherein the amount of metal particles in the protective coating is 10-30 wt. % of the protective coating on a dry weight basis, wherein the amount of inorganic binder in the protective coating is 70-90 wt. % of the protective coating on a dry weight basis, wherein the metal particles comprise one of Al particles and Al alloy particles and one of Mg particles and Mg alloy particles, and wherein a weight ratio of the one of Al particles and Al alloy particles to the one of Mg particles and Mg alloy particles is 0.6-2.5.

2. The stick electrode of claim 1, further comprising a flux coating covering the lateral surfaces of the metal rod or wire.

3. The stick electrode of claim 1, wherein the metal rod or wire is essentially solid.

4. The stick electrode of claim 3, wherein the lateral surfaces of the metal rod or wire carry a coating of copper metal.

5. The stick electrode of claim 1, wherein the metal rod or wire defines a hollow core, the stick electrode further comprising a welding flux in the hollow core.

6. The stick electrode of claim 1, the binder is inorganic.

7. The stick electrode of claim 6, wherein the inorganic binder is sodium silicate.

8. The stick electrode of claim 1, wherein the weight ratio of the one of Al particles and Al alloy particles to the one of Mg particles and Mg alloy particles is 1.0-1.5.

9. The stick electrode of claim 1, wherein the amount of metal particles in the protective coating is 15-25 wt. % of the protective coating on a dry weight basis, and further wherein the amount in organic binder in the protective coating is 75-85 wt. % of the protective coating on a dry weight basis.

10. The stick electrode of claim 9, wherein the amount of metal particles in the protective coating is 18-20 wt. % of the protective coating on a dry weight basis, and further wherein the amount in organic binder in the protective coating is 80-82 wt. % of the protective coating on a dry weight basis.

11. A shielded metal arc welding process, comprising:
    forming a weld metal layer from the stick electrode of claim 2,
    wherein forming the weld metal layer comprises forming a molten flux, wherein the molten flux comprises a metal oxide formed from the metal particles and a metal oxide formed from the flux coating comprising the same metal oxide as the metal oxide formed from the metal particles.

12. The stick electrode of claim 1, wherein the protective coating is essentially free of graphite.

13. The stick electrode of claim 12, wherein the protective coating is free of added graphite.

14. The stick electrode of claim 1, wherein the total amount of electrically conductive particles in the protective coating is no greater than 25 wt. % based on the weight of the protective coating on a dry weight basis.

15. The stick electrode of claim 14, wherein the protective coating is essentially free of graphite.

16. The stick electrode of claim 15, wherein the protective coating is free of added graphite.

17. The stick electrode of claim 2, wherein the stick electrode is configured such that, upon welding using the stick electrode in a shielded metal arc welding (SMAW) process, a molten flux is formed, the molten flux comprising a metal oxide formed from the metal particles and a metal oxide formed from the flux coating comprising the same metal oxide as the metal oxide formed from the metal particles.

18. The stick electrode of claim 1, wherein the metal particles comprise the Al alloy particles that contain at least 80 wt % Al, and comprise the Mg alloy particles that contain at least 80 wt % Mg.

* * * * *